(12) United States Patent
Cho

(10) Patent No.: US 6,916,675 B2
(45) Date of Patent: Jul. 12, 2005

(54) METHOD OF FABRICATING ARRAY SUBSTRATE FOR USE IN AN IN-PLANE SWITCHING MODE LIQUID CRYSTAL DISPLAY DEVICE

(75) Inventor: Jae-Sung Cho, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/784,738

(22) Filed: Feb. 24, 2004

(65) Prior Publication Data

US 2004/0165134 A1 Aug. 26, 2004

Related U.S. Application Data

(62) Division of application No. 09/851,325, filed on May 9, 2001, now Pat. No. 6,724,453.

(30) Foreign Application Priority Data

May 10, 2000 (KR) .......................................... 2000-24965

(51) Int. Cl.[7] .............................................. H01L 21/84
(52) U.S. Cl. ......................................... 438/30; 438/158
(58) Field of Search ........................... 438/30, 151–158, 438/159–166

(56) References Cited

U.S. PATENT DOCUMENTS 4,727,044 A  *  2/1988  Yamazaki ................... 438/166
5,182,620 A     1/1993  Shimada et al.
6,424,397 B1    7/2002  Kuo
6,509,939 B1    1/2003  Lee et al.

FOREIGN PATENT DOCUMENTS

KR    2000-007760 A    2/2000

* cited by examiner

Primary Examiner—Richard A. Booth
(74) Attorney, Agent, or Firm—McKenna Long & Aldridge LLP

(57) ABSTRACT

A method of fabricating an array substrate (as well as an array substrate itself) for use in an IPS-LCD device prevents a short-circuit between a data line and a storage capacitor. When fabricating the array substrate for use in the IPS-LCD device, the residues of a third metallic material, which remains in step portions of the double-layered common line, cause a short-circuit between a data line and a storage capacitor. In order to prevent the short-circuit, a plurality of protrusions extending from a first layer of the double-layered common line are formed at both sides of the storage capacitor. The plural protrusions have quadrilateral-shaped holes in their central portions. By forming an etching hole at each corner of the protrusion and eliminating the residues using the etching hole, the short-circuit between the storage capacitor and the data line is obviated. Accordingly, the IPS-LCD device having a high resolution is achieved.

18 Claims, 4 Drawing Sheets

METHOD OF FABRICATING ARRAY SUBSTRATE FOR USE IN AN IN-PLANE SWITCHING MODE LIQUID CRYSTAL DISPLAY DEVICE

CROSS-REFERENCE TO RELATED APPLICATIONS

This application is a divisional application of U.S. patent application Ser. No.: 09/851,325 filed May 9, 2001, now allowed; which claims priority to Korean Patent Application No.: 2000-24965, filed May 10, 2000 now U.S. Pat. No. 6,724,453, each of which is incorporated by reference for all purposes as if fully set forth herein.

BACKGROUND OF THE INVENTION

1. Field of the invention

The present invention relates to a liquid crystal display (LCD) device, and more particularly, to an array substrate for use in an in-plane switching mode liquid crystal display device (IPS-LCD).

2. Description of Related Art

In general, liquid crystal display device (LCD) includes a display panel which have upper and lower substrates attached to each other with a liquid crystal layer interposed between the upper and lower substrates. These upper and lower substrates are respectively referred to as color filter and array substrates. Further, the display panel includes retardation films and polarizers on its exterior surfaces. Because the LCD device is selectively comprised of the above-mentioned elements, it converts the state of incident light and changes light refractive index in order to have great brightness and high contrast ratio.

Although the liquid crystal molecules in the liquid crystal layer are usually twisted nematic liquid crystals, use of the twisted nematic liquid crystal layer in the large-sized display panel is limited because of unstable transmittance of the twisted nematic liquid crystal layer, which depends on viewing angle. Moreover, the light transmittance varies depending on vertical viewing angle and is asymmetrically distributed compared to symmetric distribution in horizontal viewing angle. Thus, a range of reverse-image occurs when the viewing angle is vertically slanted. Thus, the viewing angle becomes narrow.

In order to solve the problem of the narrow viewing angle, in-plane switching liquid crystal display (IPS-LCD) devices have been proposed. IPS-LCD devices typically include a lower substrate where a pixel electrode and a common electrode are disposed, an upper substrate having no electrode, and a liquid crystal interposed between the upper and lower substrates. In this typical structure, the liquid crystal molecules are driven by a horizontal electric field. Contrast ratio is increased and color-shift is prevented. Thus, the characteristics of viewing angle are improved.

FIG. 1 is a plan view illustrating one pixel of an array substrate of a conventional in-plane switching mode liquid crystal display (IPS-LCD) device. As shown, a plurality of gate lines 14 are transversely disposed on a substrate (see reference element 11 of FIG. 2A). A common line 12 is spaced apart from and disposed parallel with the gate lines 14. A plurality of data lines 13 that are spaced apart from each other are disposed across and perpendicular to the gate and the common lines 14 and 12. Each pair of gate and data lines 14 and 13 defines a pixel area "P".

Near the crossing of the gate and data lines 14 and 13, a switching device, i.e., a thin film transistor that is indicated by a portion "T", is positioned. As shown in an enlarged view of a portion "T", gate and source electrodes 21 and 17 are positioned and electrically connected with the gate and data lines 14 and 13, respectively. A drain electrode 19 is spaced apart from the source electrode 17 and overlaps one end of the gate electrode 21. The source electrode 17 also overlaps the other end of the gate electrode 21. An active layer 15 is located over the gate electrode 21 and under the source and drain electrodes 17 and 19. A first pixel-connecting line 25a, which is connected with one end of each respective pixel electrode 25, electrically contacts the drain electrode 19 through a drain contact hole 35, and is disposed parallel with the gate line 14.

Still referring to FIG. 1, a plurality of common electrodes 23 are disposed parallel with the data line 13 and spaced apart from each other. One end of each common electrode 23 is electrically connected to the common line 12, and the other end of each common electrode 23 contacts a common-connecting line 23a. A plurality of pixel electrodes 25 are disposed perpendicular to the first pixel-connecting line 25a, and communicate with the first pixel-connecting line 25a. The pixel electrodes 25 are spaced apart from each other and parallel with the adjacent common electrodes 23. Moreover, each pixel electrode 25 corresponds to an adjacent common electrode 23. The other ends of the pixel electrodes 25 are connected with a second pixel-connecting line 25b that is over the common line 12. The second pixel-connecting line 25b overlaps a portion of the common line 12 such that a storage capacitor "C" is comprised of the common line 12, the second pixel-connecting line 25b and an interposed dielectric layer. Although FIG. 1 shows four common electrodes and three pixel electrodes, the number of the common and pixel electrodes depends on spaces between electrodes.

Still referring to FIG. 1, the gate and common lines 14 and 12 have a double-layer structure, respectively, in order to prevent signal delay of these lines. Moreover, the gate electrode 21 is also a double layer. Namely, the gate line 14 is comprised of first and second layers 14a and 14b and the common line 12 is also comprised of first and second layers 12a and 12b. The first layers 14a and 12a are usually a substance having low electrical resistance, such as Aluminum (Al). However, Aluminum is low in hardness and chemical resistance. So open-circuits and oxidation easily occur during an etching process. To overcome this problem, a second layer is formed on the first layer usually of a substance having high hardness and good chemical resistance, such as Molybdenum (Mo) or Chrome (Cr). Moreover, the first and second pixel-connecting lines 25a and 25b, and the pixel electrodes 25 are a transparent conductive material, such as indium tin oxide (ITO) or indium zinc oxide (IZO). Each pixel electrode 25 is positioned between the common electrodes 23 so that each pixel and common electrodes 25 and 23 is arranged one after the other. The data line 13 and the source and drain electrodes 17 and 19 are made of the metallic material selected from a group consisting of chromium (Cr), aluminum (Al), aluminum alloy (Al alloy), molybdenum (Mo), tantalum (Ta), tungsten (W), and antimony (Sb), and the like.

However, such a structure has a problem. During a patterning process of the data line 13, the remains of the above-mentioned substance (Cr, Mo, Ta, W or the like) are left in step portions "A" around the common line 12. These remains are not completely removed during the patterning process of the data line 13, and exist in the capacitor "C" such that the short-circuit occurs between the data line 13 and the storage capacitor "C".

FIGS. 2A to 2D are cross-sectional views taken alone lines II—II and III—III of FIG. 1 and illustrate fabricating processes for the array substrate.

Referring to FIG. 2A, the first gate line 14a (see FIG. 1) is formed on the substrate 11 by depositing and patterning a conductive metal having low electrical resistance, such as Aluminum (Al). The first gate electrode 21a that is extended from the first gate line is formed with the first gate line on the substrate 11. Simultaneously, the first common line 12a is formed when the first gate line and the first gate electrode are formed. Thereafter, the second gate line 14b (see FIG. 1), the second common line 12b and the second gate electrode 21b are formed on the respective first layers of these components by depositing and patterning the conductive metal having the high hardness and chemical resistance, such as Cr, Mo, or the like. Namely, the second gate line 14b (see FIG. 1) is formed to cover the first gate line 14a, the second common line 12b is formed to cover the first common line 12a, and the second gate electrode 21b is formed to cover the first gate electrode 21a. Thus, the double-layered gate line 14 (see FIG. 1) is formed on the substrate 11. The double-layered gate electrode 21 that is extended from the gate line 14 is also formed on the substrate 11. The double-layered common line 12 that is parallel with the gate line 14 is formed.

Still referring to FIG. 2A, when forming the second common line 12b, a plurality of common electrodes 23 and the common-connecting line 23a (see FIG. 1) are formed on the substrate 11. So the common electrodes 23 are extended from the common line 12 and electrically connect the common-connecting line 23a (see FIG. 1) to the double-layered common line 12.

Referring now to FIG. 2B, a gate insulation layer 27 is formed on entire surface of the substrate 11 to cover the conductive layers formed previously. The gate insulation layer 27 is an inorganic substance, such as silicon nitride (SiNx) or silicon oxide (SiO2), or an organic substance, such as BCB (benzocyclobutene) or acryl-based resin. Subsequently, the active layer 15 is formed on the gate insulation layer 27, particularly over the gate electrode 21. After that, ohmic contact layer 16 is formed on the active layer 15, and thus the ohmic contact layer 16 is interposed between the active layer 15 and the source and drain electrodes that are formed in a later step. The active layer 15 is formed by depositing and patterning an amorphous silicon layer (a-Si), while the ohmic contact layer 16 is formed by depositing and patterning a doped amorphous silicon layer (n+ a-Si).

Referring now to FIG. 2C, the source and drain electrodes 17 and 19 are formed on the ohmic contact layer 16, and are made of the conductive metallic material selected from a group consisting of chromium (Cr), aluminum (Al), aluminum alloy (Al alloy), molybdenum (Mo), tantalum (Ta), tungsten (W), and antimony (Sb), and the like. By depositing and patterning these materials, not only the source and drain electrodes 17 and 19 but also the data line 13 is formed on the gate insulation layer 27 such that the source electrode 17 is extended from the data line 13. The source and drain electrodes 17 and 19 are spaced apart from each other and respectively overlap opposite ends of the gate electrode 21. Moreover, a portion of the ohmic contact layer 16 between the source and drain electrodes 17 and 19 is eliminated to form a channel region. At this time when forming the data line 13 and the source and drain electrodes 17 and 19, the residues of the material forming the data line 13 and the source and drain electrodes 17 and 18 are left in a ridge, or step portion, of the portion "A". The step is caused by the formation of the two layers 12a and 12b of the common line 12. After forming the data line 13 and the source and drain electrodes 17 and 19, these residues spread over a interval between the storage capacitor "C" (see FIG. 1) and the data line 13, and thus result in the short-circuit between them. A passivation layer 33 is then formed on and over the above-mentioned intermediates by depositing an organic or inorganic insulating material. After that, a drain contact hole 35 that exposes a portion of the drain electrode 19 is formed by patterning the passivation layer 33.

Now, referring to FIG. 2D, on the passivation layer 33 having the drain contact hole 35, a transparent conductive material such as indium tin oxide (ITO) or indium zinc oxide (IZO) is deposited and then patterned to form the pixel electrodes 25 and the first and second pixel-connecting lines 25a and 25b. Thus, the first pixel-connecting line 25a contacts the portion of the drain electrode 19 through the drain contact hole 35, and the second pixel-connecting line 25b overlaps the portion of the common line 12, thus the second pixel-connecting line 25b and the common line 12 comprise the storage capacitor "C".

According to aforementioned structure of the array substrate for use in the IPS-LCD device, the residual substances remaining the portions either side of the storage capacitor connect the data line to the storage capacitor. Thus, the residues cause the short in the storage capacitor. The short results in discharge of the electric charge stored in the storage capacitor through the data line. Moreover, the residues deteriorate the driving characteristics of the liquid crystals and bring about the point defect in the display panel.

SUMMARY OF THE INVENTION

Accordingly, the present invention is directed to an IPS-LCD device that substantially obviates one or more of the problems due to limitations and disadvantages of the related art.

An object of the present invention is to provide a method of fabricating an array substrate for use in the IPS-LCD device (as well as the array substrate itself), which eliminates residual substances formed on step portions of a double-layered common line.

Another object of the present invention is to provide the method (as well as the array substrate itself) of fabricating the array substrate for use in the IPS-LCD device, which prevents occurrence of a short-circuit between a storage capacitor and the data line. And thus, the point defects are prevented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the preferred embodiment of the present invention provides an array substrate for use in an IPS-LCD device, including: a plurality of double-layered gate lines on a substrate, wherein the double-layered gate lines are comprised of first and second layers that overlap each other; a plurality of data lines over the substrate, wherein each data line is perpendicular to each double-layered gate line, and wherein each pair of gate and data lines defines a pixel area; a double-layered common line on the substrate, wherein the double-layered common line is parallel with and spaced apart from the double-layered gate line, and wherein the double-layered common line is comprised of first and second layers that overlap each other; a plurality of protrusion extended from first layer of the double-layered gate lines, wherein each protrusion has a hole in its central portion; a plurality of common electrodes extended from the second layer of the double-layered common line and being parallel with the data line; a common-connecting line being perpendicular to and connecting the common electrodes with each other; a plurality of pixel electrodes spaced apart from and being parallel with the common electrodes, wherein each pixel electrode is located between the pair of common electrodes and corresponds to each common electrode; first and second pixel-connecting lines being parallel with the double-layered common line and respectively connecting the pixel electrodes to each other at each end of the pixel electrodes, wherein the second pixel-connecting line overlaps a portion of the double-layered common line to form a storage capacitor; and a switching element electrically located in one comer of the pixel area and connected with the gate and data lines, the switching element contacting the first pixel-connecting line and supplying voltage to the said pixel electrodes.

The array substrate further comprises a gate insulation layer covering the substrate and the double-layered gate and common lines, and a passivation layer formed over the swiching element and having a drain contact hole and a etching hole. The etching hole is formed over a portion of each protrusion. The switching element includes a source electrode that is extended from the data line; a double-layered gate electrode that is extended from the double-layered gate line; a drain electrode that contacts the first pixel-connecting line through the drain contact hole; an active layer that is formed over the double-layered gate electrode; and ohmic contact layer that is interposed between the active layer and the source and drain electrodes.

The source and drain electrodes and the data lines are made of the metallic material selected from a group consisting of chromium (Cr), aluminum (Al), aluminum alloy (Al alloy), molybdenum (Mo), tantalum (Ta), tungsten (W), and antimony (Sb), and the like. The double-layered common line is made of the same material of the double-layered gate lines and formed in the same layer of the double-layered gate lines. The protrusions extended from the first layer of the double-layered common line are located in both sides of the storage capacitor, and each protrusion has a quadrilateral shape, for example, a rectangular or square shape, and a quadrilateral-shaped hole in its central portion. The first layers of the double-layered gate and common lines includes aluminium (Al). The second layers of the double-layered gate and common lines are made of Molybdenum (Mo) or Chrome (Cr).

A method of fabricating an array substrate for sue in an IPS-LCD device according to the present invention includes depositing a first metallic material on a substrate; patterning the first metallic material to form a first gate electrode, first gate and common lines and a plurality of protrusions, wherein each protrusion has a hole in its central portion and is extended from the first common line, and wherein the first gate electrode is extended from the first gate line; depositing a second metallic material on the substrate and on the patterned first metallic material; patterning the second metallic material to form a second gate electrode, second gate and common lines, a common-connecting line and a plurality of common electrodes, wherein the first and second gate electrodes overlap each other to form a double-layered gate electrode, wherein the first and second common line overlap each other to form a double-layered common line, and wherein the first and second gate line overlap each other to form a double-layered gate line; forming a gate insulation layer on the substrate and on the patterned second material; forming an active layer and an ohmic contact layer in series on the gate insulation layer and over the double-layered gate electrodes; depositing a third metallic material on the ohmic contact layer and on the gate insulation layer; forming a data line, a source electrode and a drain electrode by patterning the third metallic material, wherein the source and drain electrodes overlap both ends of the double-layered gate electrodes, and wherein the data line is perpendicular to both the double-layered gate and common lines; forming a passivation layer on the patterned third metallic layer and on the gate insulation layer, wherein the passivation layer has a drain contact hole to the drain electrode, and an etching hole over each protrusion; depositing a transparent conductive material on the passivation layer having the drain contact hole and the etching hole; and forming a plurality of pixel electrodes and first and second connecting lines.

A method of fabricating an array substrate further comprises forming a channel region by patterning a portion of the ohmic contact layer between the source and drain electrodes.

Each pair of double-layered gate and data lines defines a pixel area. The double-layered common line is parallel with and spaced apart from the double-layered gate line. A plurality of the common electrodes is parallel with the data line. The common-connecting line is perpendicular to and connects the plural common electrodes with each other. A plurality of the pixel electrodes are spaced apart from and being parallel with the common electrodes. Each pixel electrode is located between the pair of common electrodes and corresponds to each common electrode. The first and second pixel-connecting lines are parallel with the double-layered common line and respectively connect the pixel electrodes to each other at each end of the pixel electrodes. The second pixel-connecting line overlaps a portion of the double-layered common line to form a storage capacitor. The protrusions extended from the first common line is located in both sides of the storage capacitor. The double-layered gate electrode, the active layer, the ohmic contact layer, the source electrode and the drain electrode comprise a thin film transistor that is located near the crossing the double-layer gate line and data line.

The third metallic material is selected from a group consisting of chromium (Cr), aluminum (Al), aluminum alloy (Al alloy), molybdenum (Mo), tantalum (Ta), tungsten (W), and antimony (Sb), and the like. The double-layered common line is made of the same material of the double-layered gate lines and formed in the same layer of the double-layered gate lines. Each protrusion has a quadrilateral shape and a quadrilateral-shaped hole in its central portion. The first metallic material includes aluminium (Al). The second metallic material is selected from a group consisting of molybdenum (Mo), chrome (Cr) and tungsten (W).

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 1:
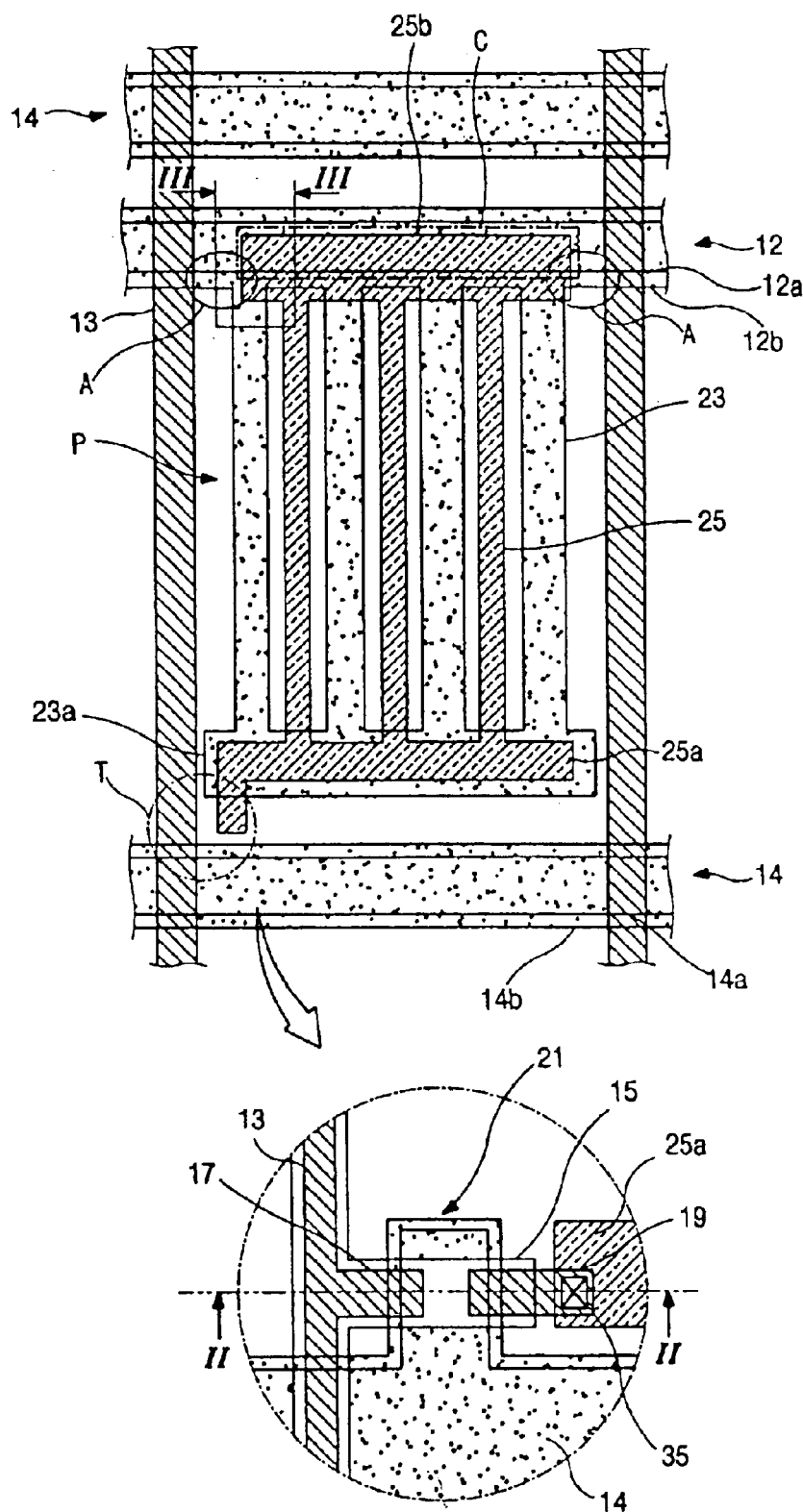
FIG. 1 is a plan view illustrating one pixel of an array substrate of a conventional in-plane switching mode liquid crystal display (IPS-LCD) device.
Figure 2A:
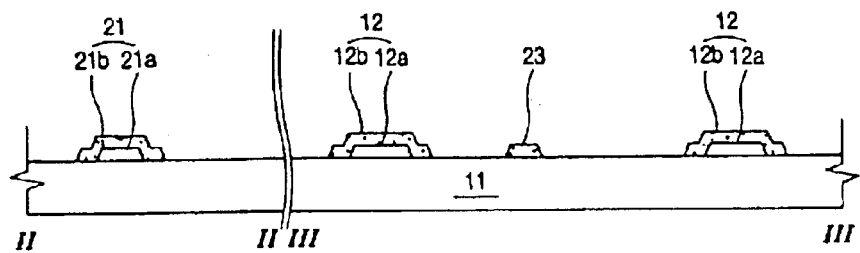
FIGS. 2A to 2D are cross-sectional views taken alone lines II—II and III—III of FIG. 1 and illustrate fabricating processes for the array substrate.
Figure 2B:
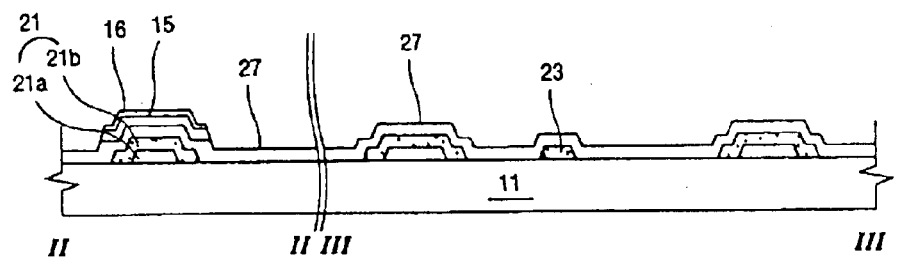
Figure 2C:
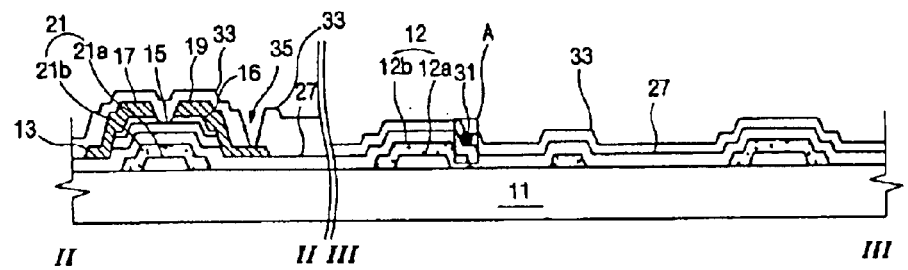
Figure 2D:
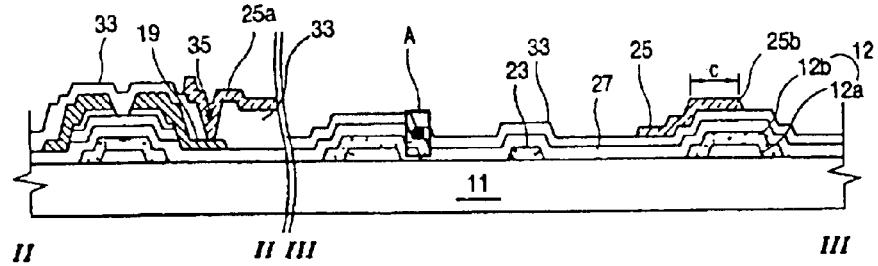
Figure 3:
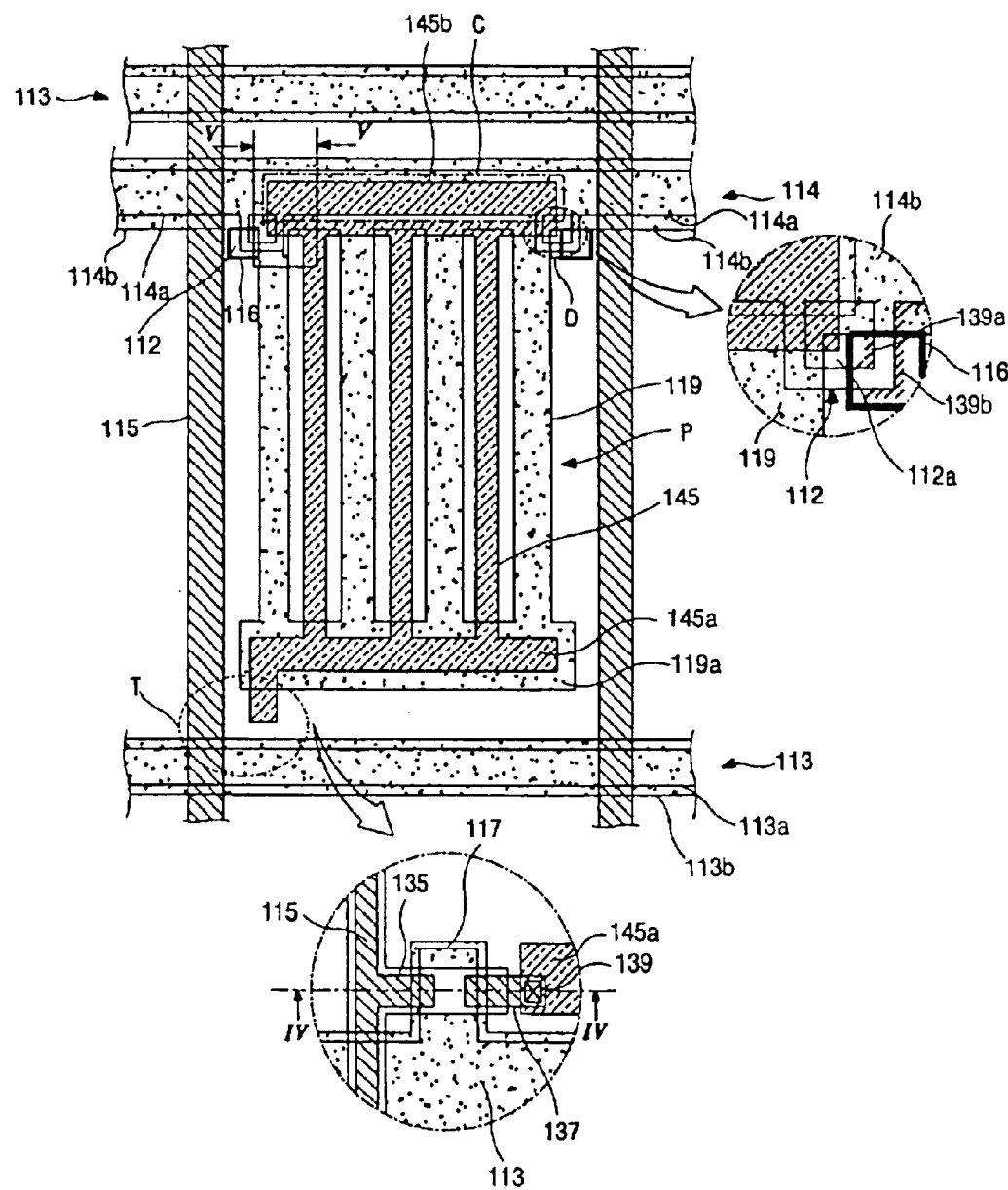
FIG. 3 is a plan view illustrating one pixel of an array substrate of an in-plane switching mode liquid crystal display (IPS-LCD) device according to a preferred embodiment.

FIG. 3 is a plan view illustrating one pixel of an array substrate of an in-plane switching mode liquid crystal display (IPS-LCD) device according to a preferred embodiment of the present invention. As shown, a plurality of gate lines 113 are transversely disposed on a substrate (see reference element 111 of FIG. 4A). A common line 114 is spaced apart from and disposed parallel with the gate lines 113. A plurality of data lines 115 that are spaced apart from each other are disposed across and perpendicular to the gate and the common lines 113 and 114. Each pair of gate and data lines. 113 and 114 defines a pixel area "P".

A switching device, i.e., a thin film transistor (TFT), that is indicated by a portion "T", is positioned near the crossing of the gate and data lines 113 and 114. As shown in an enlarged view of a portion "T", gate and source electrodes 135 and 137 are positioned and electrically connected with the gate and data lines 113 and 115, respectively. A drain electrode 137 is spaced apart from the source electrode 135 and overlaps one end of the gate electrode 117. The source electrode 135 also overlaps the other end of the gate electrode 117. An active layer 133 is located over the gate electrode 117 and under the source and drain electrodes 135 and 137. A first pixel-connecting line 145a, which is connected with respective first ends of pixel electrodes 145, electrically contacts the drain electrode 137 through a drain contact hole 139 and is disposed parallel with the gate line 113.

Still referring to FIG. 3, a plurality of common electrodes 119 are disposed parallel with the data line 115 and spaced apart from each other. One end of each common electrode 119 is electrically connected to the common line 114, and the other end of each common electrode 119 contacts a common-connecting line 119a. A plurality of pixel electrodes 145 are disposed perpendicular to the first pixel-connecting line 145a, and communicate with the first pixel-connecting line 145a. The pixel electrodes 145 are spaced apart from each other and parallel with the adjacent common electrodes 119. Moreover, each pixel electrode 145 corresponds to the adjacent common electrodes 119. The other ends of the pixel electrodes 145 are connected with a second pixel-connecting line 145b that is over the common line 114. The second pixel-connecting line 145b overlaps a portion of the common line 114 such that a storage capacitor "C" is comprised of the common line 114, the second pixel-connecting line 145b and an interposed dielectric layer. Although FIG. 3 shows four common electrodes and three pixel electrodes, the number of the common and pixel electrodes depends on spaces between electrodes.

Still referring to FIG. 3, the gate and common lines 113 and 114 have a double-layer structure, respectively, in order to prevent signal delay of these lines. Moreover, the gate electrode 117 is also a double layer. Namely, the gate line 113 is comprised of first and second layers 113a and 113b and the common line 114 is also comprised of first and second layers 114a and 114b. The first layers 113a and 114a are usually a substance having low electrical resistance, such as Aluminum (Al). The second layers are formed on the first layers, and they are usually formed of a substance having high hardness and good chemical resistance, such as Molybdenum (Mo) or Chromium (Cr). According to the principles of the present invention, a first common line 114a has plural protrusions 112 extend from the common line 114 to the pixel area "P". Each protrusion 112 has a quadrilateral-shaped hole 112a in its central portion, as shown an enlarged view of a portion "D". A plurality of the common electrodes 119 extend from the second common line 114b such that the common electrodes 119 and the common-connecting line 119a are made of the same material as the second common line 114b. The protrusions 112 having quadrilateral-shaped holes or apertures 112a are positioned under the corners of the second common line 114b and the common electrodes 119. However, the second common line 114b and the common electrodes 119 do not cover all parts of each protrusion 112. Namely, each protrusion 112 requires a portion for etching, i.e., an etching hole 116, that is not covered by either the second common line 114b or the common electrodes 119. Although the quadrilateral-shaped hole 112a is depicted in FIG. 3, the shape of hole can vary, and the shape of the protrusion 112 can vary as well.

As shown in the enlarged view of the portion "D" of FIG. 3, the residues 139a existing around interior step portions of the protrusions 112 (i.e., around the quadrilateral-shaped holes 112a) do not affect the storage capacitor "C" and the data line 115. The residues 139a do not cause the short circuit between the data line 115 and the storage capacitor "C". However, the residues 139b existing around exterior step portions of the protrusions 112 can connect the data line 115 to the storage capacitor "C", and thus cause the short-circuit between the data line 115 and the storage capacitor "C". To overcome this problem, the etching hole 116 is formed at one corner of each protrusion 112 in the preferred embodiment of the present invention. Thus, the residues 139b can be removed via this etching hole 116.

Moreover, the first and second pixel-connecting lines 145a and 145b, and the pixel electrodes 145 are a transparent conductive material, such as indium tin oxide (ITO) or indium zinc oxide (IZO). Each pixel electrode 145 is positioned between the common electrodes 119 so that each pixel and common electrode 145 and 119 is arranged one after the other. The data lines 115 and the source and drain electrodes 135 and 139 are made of the metallic material selected from a group consisting of chromium (Cr), aluminum (Al), aluminum alloy (Al alloy), molybdenum (Mo), tantalum (Ta), tungsten (W), and antimony (Sb), and the like FIGS. 4A to 4D are cross-sectional views taken alone lines IV—IV and V—V of FIG. 3 and illustrate fabricating processes for the array substrate according to the preferred embodiment.

Figure 4A:
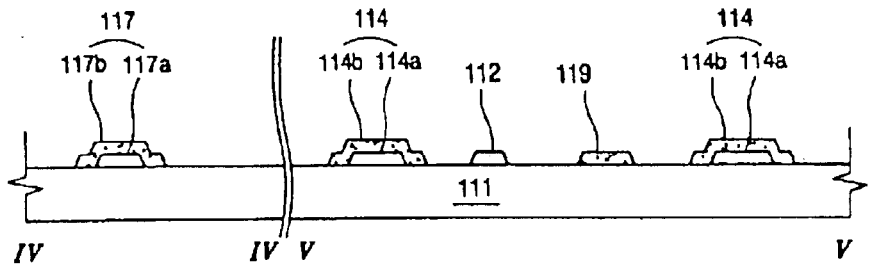
FIGS. 4A to 4D are cross-sectional views taken alone lines IV—IV and V—V of FIG. 3 and illustrate fabricating processes for the array substrate according to the preferred embodiment.

Referring to FIG. 4A, the first gate line 113a (see FIG. 3) is formed on the substrate 111 by depositing and then patterning a conductive metal having low electrical resistance, such as Aluminum (Al). The first gate electrode 117a that extends from the first gate line is formed with the first gate line on the substrate 111. Simultaneously, the first common line 114a is formed when the first gate line 113a (see FIG. 3) and the first gate electrode 117a are formed. Moreover, the protrusion 112 is formed with the first common line 114a in the same layer such that the protrusion 112 is connected with the first common line 114a.

Thereafter, the second gate line 113b (see FIG. 3), the second common line 114b and the second gate electrode 117b are formed on the first layers of them by depositing and patterning the conductive metal having the high hardness and chemical resistance, such as Cr, Mo, or the like. Namely, the second gate line 113b (see FIG. 3) is formed to cover the first gate line 113a, the second common-line 114b is formed to cover the first common line 114a, and the second gate electrode 117b is formed to cover the first gate electrode 117a. Thus, the double-layered gate line 113 (see FIG. 3) is formed on the substrate 111. The double-layered gate electrode 117 that extends from the gate line 113 is also formed on the substrate 111. The double-layered common line 114 that is parallel with the gate line 113 is formed.

Still referring to FIG. 4A, when forming the second common line 114b, a plurality of common electrodes 119 and the common-connecting line 119a (see FIG. 3) are formed on the substrate 111. So the common electrodes 119 extend from the common line 114 and electrically connect the common-connecting line 119a (see FIG. 3) to the double-layered common line 117.

Figure 4B:
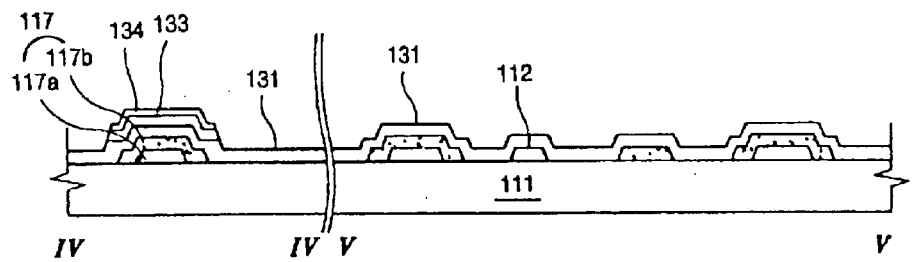

Referring now to FIG. 4B, a gate insulation layer 131 is formed on the surfaces of the above-mentioned components and on the substrate 111 to cover them. The gate insulation layer 131 is selectively an inorganic substance, such as silicon nitride (SiNx) or silicon oxide (SiO2), or an organic substance, such as BCB (benzocyclobutene) or acryl-based resin. Subsequently, the active layer 133 is formed on the gate insulation layer 131, particularly over the gate electrode 117. After that, ohmic contact layer 134 is formed on the active layer 133, and thus the ohmic contact layer 134 is interposed between the active layer 133 and the source and drain electrodes that are formed in a later step. The active layer 133 is formed by depositing and then patterning an amorphous silicon layer (a-Si), while the ohmic contact layer 134 is formed by depositing and patterning a doped amorphous silicon layer (n+a-Si).

Figure 4C:
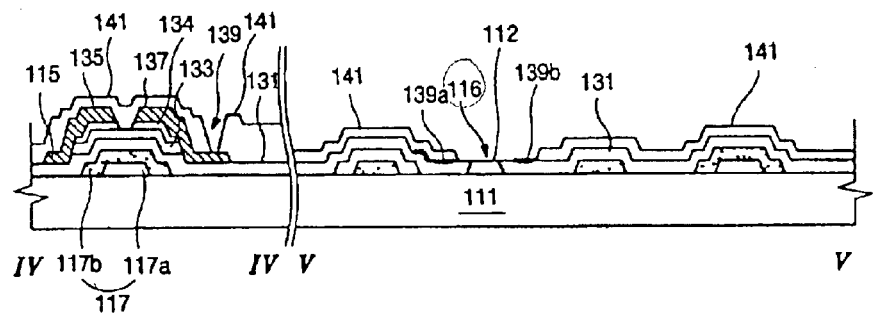

Referring now to FIG. 4C, the source and drain electrodes 135 and 137 are formed on the ohmic contact layer 134 and on the gate insulation layer 131, and are made of the conductive metallic material selected from a group consisting of chromium (Cr), aluminum (Al), aluminum alloy (Al alloy), molybdenum (Mo), tantalum (Ta), tungsten (W), and antimony (Sb), and the like. By depositing and patterning these materials, not only the source and drain electrodes 135 and 137, but also the data line 115 is formed on the gate insulation layer 131 such that the source electrode 135 is extended from the data line 115. The source and drain electrodes 135 and 137 are spaced apart from each other and respectively overlap both ends of the gate electrode 117. Moreover, a portion of the ohmic contact layer 134 between the source and drain electrodes 135 and 137 is eliminated to form a channel region.

At this time when forming the data line 115 and the source and drain electrodes 135 and 137, the residues 139a and 139b of the material forming the data line 115 and the source and drain electrodes 135 and 137 are left around the step portions of the protrusions 112 that extend from the first common line 114a. The residual material 139a that is left around the interior step portion of the protrusion 112 does not contact the data line 115, and thus it does not cause any defect in the array substrate. However, the residual material 139b that is left around the exterior step portion of the protrusion 112 exists and disperses from the data line 115 to the storage capacitor that is formed in a later step. Thus, the residual material 139b results in the short-circuit and point defect in the array substrate.

In order to remove these residues 139a and 139b, the particular method is required and that method is explained hereinafter. A passivation layer 141 is formed on and over the above-mentioned intermediates by depositing an organic or inorganic insulating material. After that, a drain contact hole 139 that exposes a portion of the drain electrode 137 is formed by patterning the passivation layer 141 using a dry etch method. Simultaneously, the etching hole 116 is formed with the drain contact hole 137 at one corner of the protrusion 112. Therefore, the residual material 139b that is in the exterior step portion of the protrusion 112 is eliminated by the dry etch. If the residual material 139b is not completely removed during that dry-etching process, it can be taken off entirely in a later step that is explained referring to FIG. 4D.

Figure 4D:
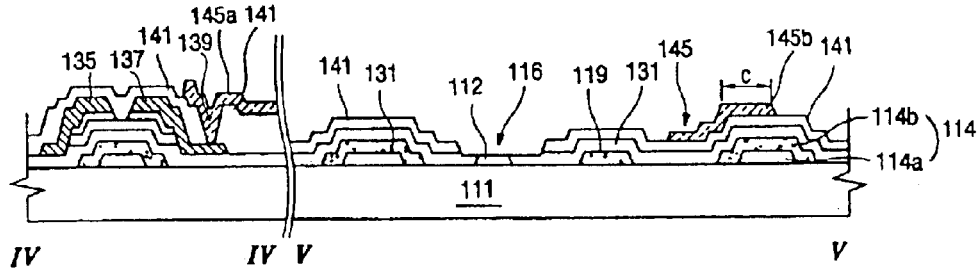

Referring now to FIG. 4D, on the passivation layer 141 having the drain contact hole 139 and the etching hole 116, a transparent conductive material such as indium tin oxide (ITO) or indium zinc oxide (IZO) is deposited. The transparent conductive material is patterned to form the pixel electrodes 145 and the first and second pixel-connecting lines 145a and 145b using a wet etch method. Thus, the first pixel-connecting line 145a contacts the drain electrode 137 through the drain contact hole 139. The second pixel-connecting line 145b overlaps the portion of the common line 114, thus the second pixel-connecting line 145b and the common line 114 comprise the storage capacitor "C", with the gate insulation and passivation layers 131 and 141 as a dielectric layer. Even if the residual material 139b is not completely removed by the above-mentioned dry etch, it is entirely removed during this wet-etching process. Namely, using the wet etch method that is used to form the pixel electrodes 145 and the first and second pixel-connecting lines 145a and 145b, some portion of the protrusion 112 which is exposed by the etching hole 116 is removed, and thus the residual material 139a is completely removed. Moreover, the interior residual material 139a can also be removed. Although the IPS-LCD device adopts these method and structure in the preferred embodiment, these methods and structures can be used in the array substrate for use in a typical LCD device.

As described herein before, according to the preferred embodiment of the present invention, the short-circuit occurring between the storage capacitor and the data line is prevented. Thus, the IPS-LCD device does not have any point defect and the high resolution is achieved.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for use in an IPS-LCD device, comprising:
   depositing a first metallic material on a substrate;
   patterning the first metallic material to form a first gate electrode, a first gate line, a first common line, and a plurality of protrusions, wherein each protrusion has a hole in a central portion thereof and extends from the first common line, and wherein the first gate electrode extends from the first gate line;

depositing a second metallic material on the substrate and on the patterned first metallic material;

patterning the second metallic material to form a second gate electrode, second gate line, second common line, a common-connecting line, and a plurality of common electrodes, wherein the first and second gate electrodes overlap each other to form a double-layered gate electrode, wherein the first and second common lines overlap each other to form a double-layered common line, and wherein the first and second gate lines overlap each other to form a double-layered gate line;

forming a gate insulation layer on the substrate and on the patterned second metallic material;

forming an active layer and an ohmic contact layer sequentially on the gate insulation layer and over the double-layered gate electrodes;

depositing a third metallic material on the ohmic contact layer and on the gate insulation layer;

forming a data line, a source electrode, and a drain electrode by patterning the third metallic material, wherein the source and drain electrodes are over the double-layered gate electrodes, and wherein the data line is perpendicular to both the double-layered gate lines and double-layered common lines;

forming a passivation layer on the patterned third metallic layer and on the gate insulation layer, wherein the passivation layer has a drain contact hole to the drain electrode, and an etching hole over each protrusion;

depositing a transparent conductive material on the passivation layer having the drain contact hole and the etching hole; and forming a plurality of pixel electrodes and first and second connecting lines.

2. A method of fabricating an array substrate according to claim 1, further comprising: forming a channel region by patterning a portion of the ohmic contact layer between the source and drain electrodes.

3. A method of fabricating an array substrate according to claim 1, wherein each pair of double-layered gate lines and data lines defines a pixel area.

4. A method of fabricating an array substrate according to claim 1, wherein the double-layered common line is parallel with and spaced apart from the double-layered gate line.

5. A method of fabricating an array substrate according to claim 1, wherein a plurality of the common electrodes are parallel with the data line.

6. A method of fabricating an array substrate according to claim 1, wherein the common-connecting line is perpendicular to and connects the plural common electrodes with each other.

7. A method of fabricating an array substrate according to claim 1, wherein a plurality of the pixel electrodes are spaced apart from and parallel with the said common electrodes.

8. A method of fabricating an array substrate according to claim 1, wherein each pixel electrode is located between the pair of common electrodes and corresponds to each common electrode.

9. A method of fabricating an array substrate according to claim 1, wherein the first and second pixel-connecting lines are parallel with the double-layered common line and respectively connect the pixel electrodes to each other at respective first and second ends of the pixel electrodes.

10. A method of fabricating an array substrate according to claim 1, wherein the second pixel-connecting line overlaps a portion of the double-layered common line to form a storage capacitor.

11. The array substrate according to claim 10, wherein the protrusions extended from the first common line are located on both sides of the storage capacitor.

12. A method of fabricating an array substrate according to claim 1, wherein the double-layered gate electrode, the active layer, the ohmic contact layer, the source electrode and the drain electrode comprise a thin film transistor that is located near the crossing of a double-layer gate line and data line.

13. A method of fabricating an array substrate according to claim 1, wherein the third metallic material is selected from a group consisting of chromium (Cr), aluminum (Al), aluminum alloy (Al alloy), molybdenum (Mo), tantalum (Ta), tungsten (W), and antimony (Sb).

14. A method of fabricating an array substrate according to claim 1, wherein the double-layered common line is made of the same material as the double-layered gate lines and formed in the same layer as the double-layered gate lines.

15. A method of fabricating an array substrate according to claim 1, wherein each protrusion has a quadrilateral shape.

16. A method of fabricating an array substrate according to claim 1, wherein each protrusion has a quadrilateral-shaped hole in a central portion thereof.

17. A method of fabricating an array substrate according to claim 1, wherein the first metallic material includes aluminium (Al).

18. A method of fabricating an array substrate according to claim 1, wherein the second metallic material is selected from a group consisting of molybdenum (Mo), chrome (Cr) and tungsten (W).

* * * * *